United States Patent
Kim et al.

(10) Patent No.: US 10,225,844 B2
(45) Date of Patent: Mar. 5, 2019

(54) METHOD FOR SELECTING OR RESELECTING RELAY FOR PROXIMITY SERVICE

(71) Applicant: LG ELECTRONICS INC., Seoul (KR)

(72) Inventors: Hyunsook Kim, Seoul (KR); Kidong Lee, Seoul (KR); Jaehyun Kim, Seoul (KR); Taehun Kim, Seoul (KR); Taehyeon Kim, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 181 days.

(21) Appl. No.: 14/903,020

(22) PCT Filed: Jul. 2, 2014

(86) PCT No.: PCT/KR2014/005903
§ 371 (c)(1),
(2) Date: Jan. 5, 2016

(87) PCT Pub. No.: WO2015/002456
PCT Pub. Date: Jan. 8, 2015

(65) Prior Publication Data
US 2016/0135203 A1 May 12, 2016

Related U.S. Application Data

(60) Provisional application No. 61/843,059, filed on Jul. 5, 2013, provisional application No. 61/843,857, filed (Continued)

(51) Int. Cl.
*H04W 88/04* (2009.01)
*H04W 72/08* (2009.01)
(Continued)

(52) U.S. Cl.
CPC ............ *H04W 72/085* (2013.01); *H04L 67/16* (2013.01); *H04W 4/023* (2013.01); *H04W 48/20* (2013.01);
(Continued)

(58) Field of Classification Search
CPC ... H04W 88/04; H04W 8/005; H04W 84/047; H04W 40/22; H04W 76/043;
(Continued)

(56) References Cited

U.S. PATENT DOCUMENTS

2014/0171062 A1* 6/2014 Fallgren ................ H04W 40/22
455/422.1

FOREIGN PATENT DOCUMENTS

KR 10-2011-0016444 2/2011
KR 10-2011-0072583 6/2011
(Continued)

OTHER PUBLICATIONS

PCT International Application No. PCT/KR2014/005903, Written Opinion of the International Searching Authority dated Sep. 29, 2014, 1 page.

*Primary Examiner* — Jae Y Lee
*Assistant Examiner* — Aixa A Guadalupe Cruz
(74) *Attorney, Agent, or Firm* — Lee, Hong, Degerman, Kang & Waimey PC

(57) ABSTRACT

One embodiment of the present specification provides a method for selecting or reselecting a relay for a proximity service. The method comprises the steps of: receiving, by user equipment (UE) which is to receive a relay service, synchronization signals from a plurality of other UEs capable of operating as relays; and receiving, by the UE, announce messages from the plurality of other UEs capable of operating as the relays. Here, the announce messages from each of the other UEs can contain relay type informa-
(Continued)

tion on whether to support a UE-to-network relay service, packet data network (PDN)/access point name (APN) information, and service/group information. The method further comprises the steps of: generating, by the UE, a candidate relay list on the basis of the relay type information, the PDN/APN information, and the service/group information within the announce messages received from the plurality of other UEs; and selecting or reselecting, by the UE, one of the other UEs within the candidate relay list in consideration of relay type, PDN/APN, and service/group information necessary for a service of the UE.

10 Claims, 18 Drawing Sheets

Related U.S. Application Data on Jul. 8, 2013, provisional application No. 61/899,891, filed on Nov. 5, 2013, provisional application No. 62/006,868, filed on Jun. 2, 2014.

(51) Int. Cl.
*H04W 48/20* (2009.01)
*H04W 4/02* (2018.01)
*H04L 29/08* (2006.01)
*H04W 76/23* (2018.01)
*H04W 76/14* (2018.01)
*H04W 84/04* (2009.01)
*H04W 4/10* (2009.01)
*H04W 4/21* (2018.01)

(52) U.S. Cl.
CPC ............ *H04W 76/14* (2018.02); *H04W 76/23* (2018.02); *G06F 2221/2111* (2013.01); *H04W 4/10* (2013.01); *H04W 4/21* (2018.02); *H04W 84/047* (2013.01); *H04W 88/04* (2013.01)

(58) Field of Classification Search
CPC ... H04W 36/0055; H04W 4/005; H04W 4/10; H04W 84/18; H04B 7/15507; H04B 7/15557; H04B 17/318; H04L 63/104
See application file for complete search history.

(56) References Cited

FOREIGN PATENT DOCUMENTS

| KR | 10-1264026 | 5/2013 |
| WO | 2009/150160 | 12/2009 |

* cited by examiner

METHOD FOR SELECTING OR RESELECTING RELAY FOR PROXIMITY SERVICE

CROSS-REFERENCE TO RELATED APPLICATIONS

This application is the National Stage filing under 35 U.S.C. 371 of International Application No. PCT/KR2014/005903, filed on Jul. 2, 2014, which claims the benefit of U.S. Provisional Application No. 61/843,059, filed on Jul. 5, 2013, 61/843,857, filed Jul. 8, 2013, 61/899,891, filed Nov. 5, 2013, and 62/006,868, filed on Jun. 2, 2014, the contents of which are all hereby incorporated by reference herein in their entirety.

BACKGROUND OF THE INVENTION

Field of the Invention

The present invention relates to proximity communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

As illustrated, an evolved UMTS terrestrial radio access network (E-UTRAN) is connected to an evolved packet core (EPC). The E-UTRAN is a radio access network defined after 3GPP release-8, and is also called a 4th generation (4G) (i.e., LTE) network. A radio access network before the LTE, i.e., a 3rd generation (3G) radio access network, is a UTRAN.

The E-UTRAN includes a base station (BS) (or eNodeB) 20 which provides a control plane and a user plane to a user equipment (UE). The BSs (or eNodeBs) 20 may be interconnected by means of an X2 interface.

Layers of a radio interface protocol between the UE and the BS (or eNodeB) 20 can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Meanwhile, the EPC may include various constitutional elements. Among them, a mobility management entity (MME) 51, a serving gateway (S-GW) 52, a packet data network gateway (PDN GW) 53, and a home subscriber server (HSS) 54 are illustrated in FIG. 1.

The BS (or eNodeB) 20 is connected to the MME 51 of the EPC through an S1 interface, and is connected to the S-GW 52 through S1-U.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| Reference point | Description |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 6a is an exemplary diagram showing common communication.

Referring to FIG. 6a, a UE#1 10-1 is present within the coverage of an eNodeB#1 20-1, and a UE#2 10-2 is present within the coverage of an eNodeB#2 20-2. Communication between the UE#1 10-1 the UE#2 10-2 may be performed via a core network, for example, an S-GW 52 and a P-GW 53. As such, a communication path via the core network is called an infrastructure data path. Furthermore, communication through this infrastructure data path is called infrastructure communication.

FIG. 6b shows the concept of proximity communication that is expected to be introduced in the next generation communication system.

Due to an increase in user requirements for Social Network Service (SNS), as demands for discovery and special applications/services between physically adjacent UEs, that is, demands for proximity-based applications/services appear, a need for proximity communication between the UEs is further increased.

In order to reflect the above-mentioned requirements, as shown in FIG. 6b, a scheme to enable a direct communication between a UE#1 10-1, a UE#2 10-2 and a UE#3 10-3 or between a UE#4 10-4, a UE#5 10-5 and a UE#6 10-6 without the intervention of an eNodeB 20 is under discussion. Surely, with the help of the eNodeB 20, the UE#1 10-1 and the UE#4 10-4 may directly communicate with each other. Meanwhile, the UE#1 10-1 may serve as a repeater for the UE#2 10-2 and the UE#3 10-3 that are distant from the center of a cell. Similarly, the UE#4 10-4 may function as a repeater for the UE#5 10-5 and the UE#6 10-6 that are distant from the center of a cell.

As described above, the introduction of proximity communication between UEs in the next generation system is being discussed.

However, when a connection with the UE#1 10-1 playing a role of a relay is cut Off, a procedure of reselecting another UE to recover the cut-off connection is not provided in the conventional technique, thereby causing a problem in that group communication is suspended.

SUMMARY OF THE INVENTION

Accordingly, one disclosure of the present specification aims to provide a method capable of solving the aforementioned problem.

To acheive the aforementioned aim, one disclosure of the present specification provides a method of selecting or reselecting a relay for a proximity service. The method may comprise: receiving, by a user equipment (UE) which is to receive a relay service, synchronization signals from a plurality of other UEs capable of operating as a relay; receiving, by the UE, announce messages from the plurality of other UEs capable of operating as the relay, wherein the announce messages from each of the other UEs contain relay type information on whether to support a UE-to-network relay service, packet data network (PDN)/access point name (APN) information, and service/group information; generating, by the UE, a candidate relay list on the basis of the relay type information, PDN/APN information, and service/group information contained in the announce messages received from the plurality of other UEs; and selecting or reselecting, by the UE, one of the other UEs in the candidate relay list in consideration of relay type, PDN/APN, and service/group information necessary for a service of the UE.

A cause of considering the APN is to allow that a new PDN connection process is not performed for the APN for the UE when the UE selects another UE using the same APN as the ANP for the service of the UE as the relay.

The method may further comprise: measuring reference signal received power (RSRP) and reference signal received quality (RSRQ) on the basis of the synchronization signals received from the plurality of other UEs, wherein in the selecting or reselecting one of the other UEs, the RSRP and the RSRQ are additionally considered.

A period of updating the candidate relay list and a size of the candidate relay list are determined according to whether the UE is a talker or a listener in a group communication service.

The size of the candidate relay list is expressed by the number of other UEs included in the candidate relay list.

The method of claim 1, wherein the synchronization signal comprises a cell identifier (ID) of a base station and ID information of the UE capable of operating as the relay.

To acheive the aforementioned aim, one disclosure of the present specification provides a user equipment (UE) for selecting or reselecting a relay for a proximity service. The UE may comprise: a receiver for receiving a synchronization signal and an announce message from each of a plurality of other UEs capable of operating as the relay, wherein the announce messages from each of the other UEs contain relay type information on whether to support a UE-to-network relay service, packet data network (PDN)/access point name (APN) information, and service/group information; and a controller for generating a candidate relay list on the basis of the relay type information, PDN/APN information, and service/group information contained in the announce messages received from the plurality of other UEs, and for selecting or reselecting one of the other UEs in the candidate relay list in consideration of relay type, PDN/APN, and service/group information necessary for a service of the UE.

According to a disclosure of the present specification, the aforementioned problem of the conventional technique is solved.

DESCRIPTION OF EXEMPLARY EMBODIMENTS

Figure 1:
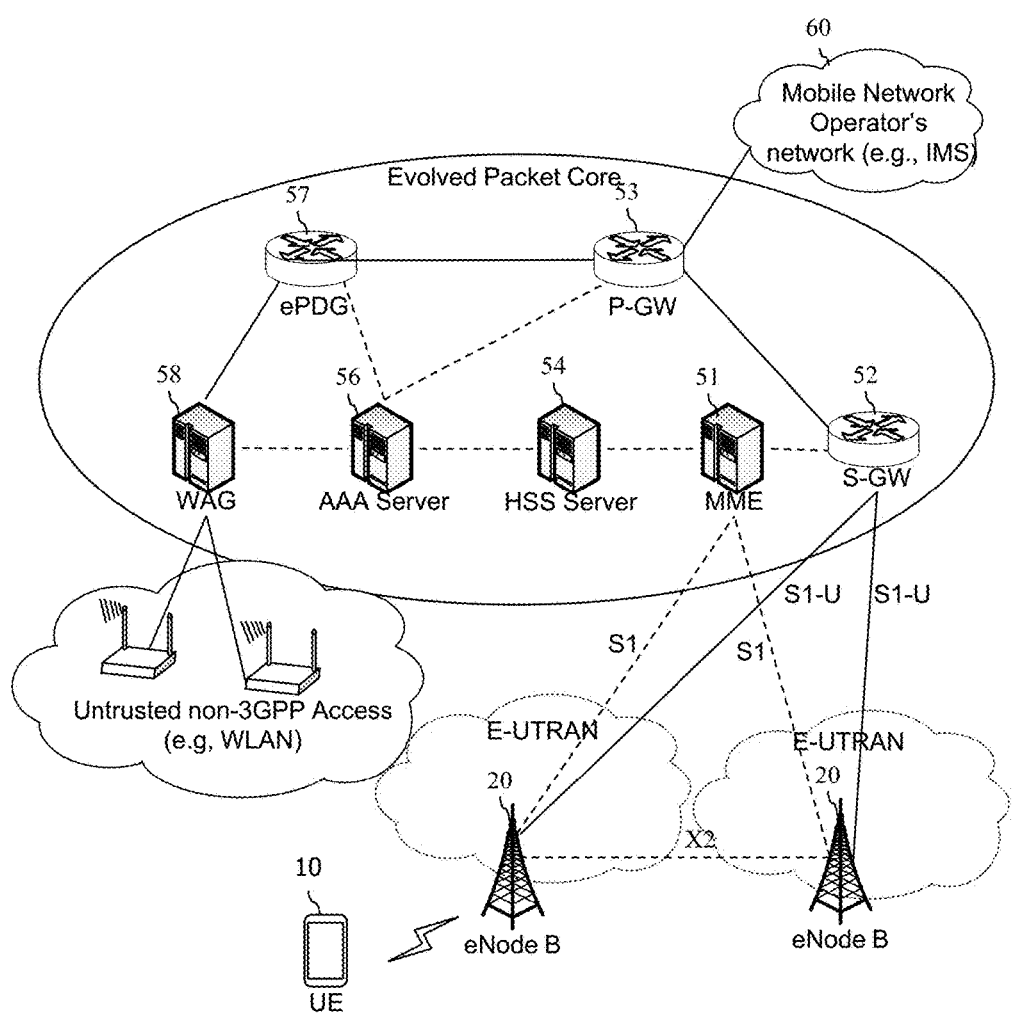
FIG. 1 shows the configuration of an evolved mobile communication network.
Figure 2:
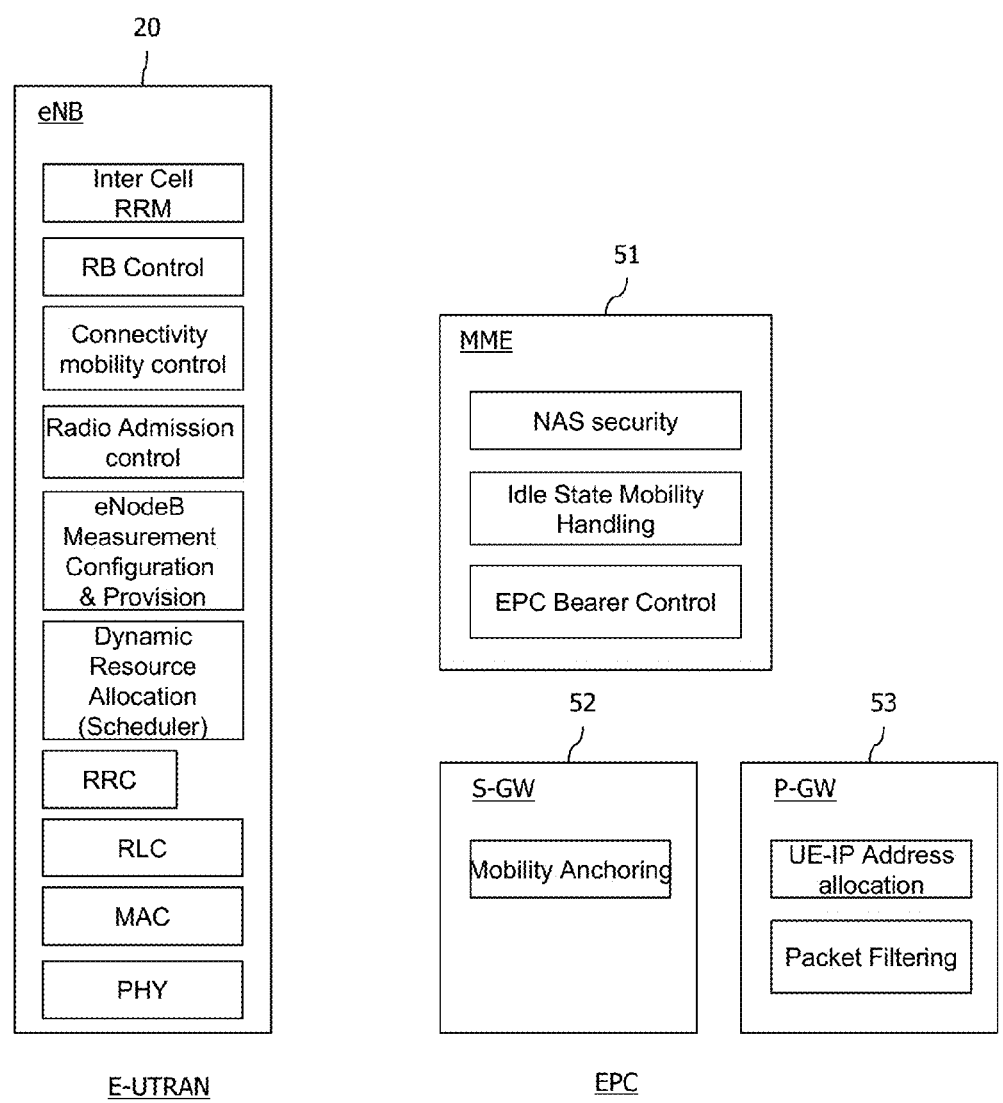
FIG. 2 is an exemplary diagram showing the architecture of a common E-UTRAN and a common EPC.
Figure 3:
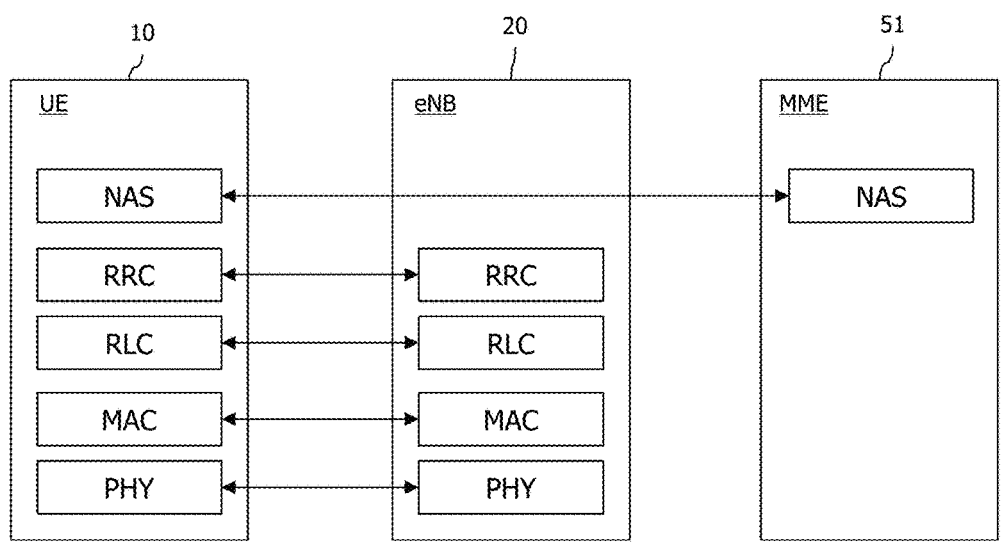
FIG. 3 is an exemplary diagram showing the structure of a radio interface protocol in a control plane between UE and an eNodeB.
Figure 4:
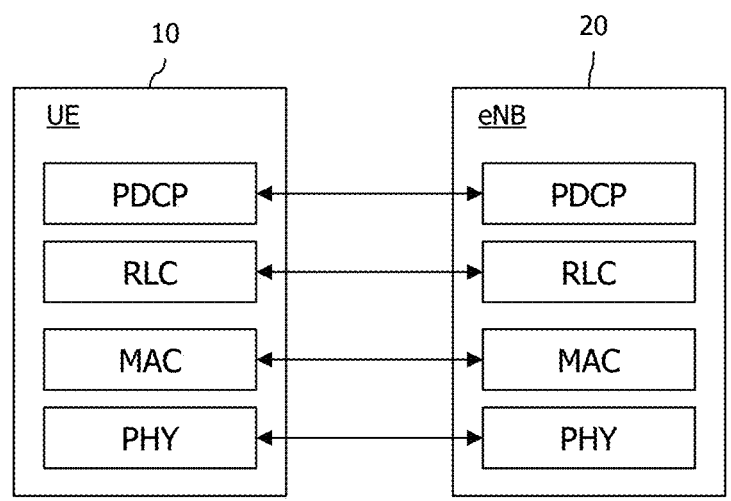
FIG. 4 is another exemplary diagram showing the structure of a radio interface protocol in a user plane between UE and a base station.
Figure 5:
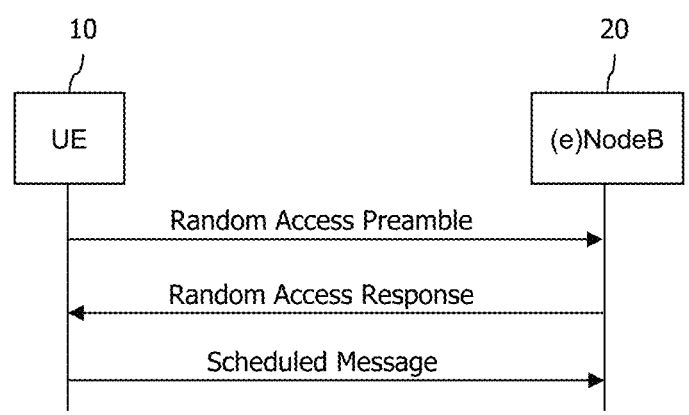
FIG. 5 is a flowchart illustrating a random access process in 3GPP LTE.
Figure 6A:
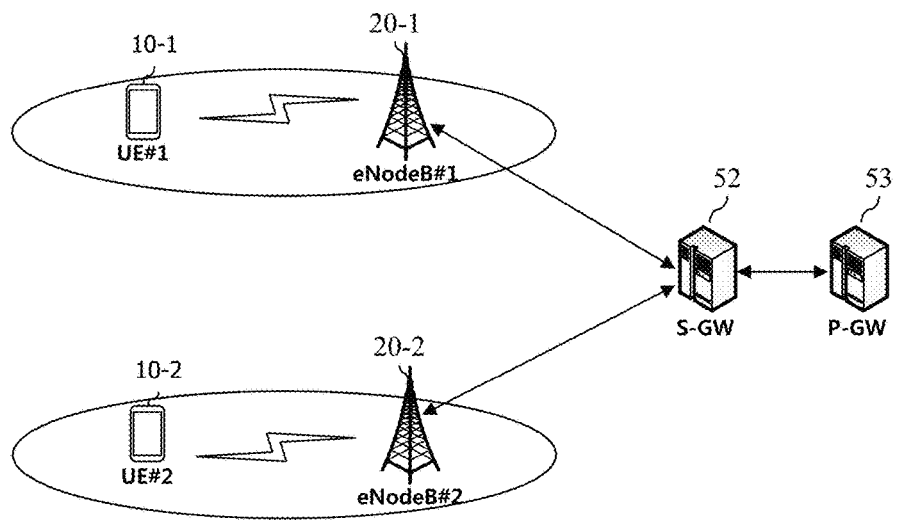
FIG. 6a is an exemplary diagram showing common communication.
Figure 6B:
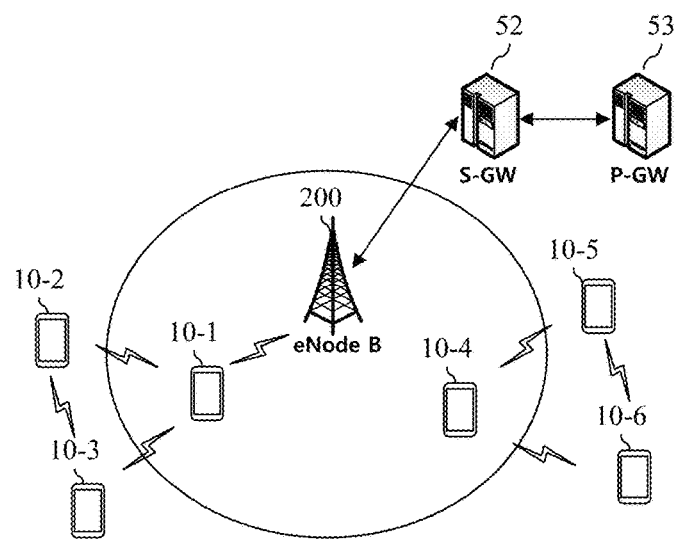
FIG. 6b shows the concept of proximity communication that is expected to be introduced in the next generation communication system.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art.

Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

A GERAN: an abbreviation of a GSM EDGE Radio Access Network, and it refers to a radio access section that connects a core network and UE by GSM/EDGE.

A UTRAN: an abbreviation of a Universal Terrestrial Radio Access Network, and it refers to a radio access section that connects the core network of the 3rd generation mobile communication and UE.

An E-UTRAN: an abbreviation of an Evolved Universal Terrestrial Radio Access Network, and it refers to a radio access section that connects the core network of the 4th generation mobile communication, that is, LTE, and UE.

UMTS: stands for Universal Mobile Telecommunication System and means a 3rd generation mobile communication network.

UE/MS: User Equipment/Mobile Station. Means a terminal device.

EPC: stands for Evolved Packet Core and means a core network supportive of a long term evolution (LTE) network. An evolved version of UMTS.

PDN (Public Data Network): an independent network in which a service providing server is located.

PDN connection: connection from UE to PDN, i.e., association (connection) between a UE represented with an IP address and a PDN represented with an APN (access point name).

PDN-GW (Packet Data Network Gateway): a network node of an EPS network performing functions such as UE IP address allocation, packet screening & filtering, and charging data collection.

Serving GW (Serving Gateway): a network node of an EPS network performing functions such as mobility anchor, packet routing, idle mode packet buffering, and triggering MME to page UE.

APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e)NodeB: collectively denotes NodeB and eNodeB.

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority).

NAS (Non-Access-Stratum): upper stratum of a control plane between a UE and an MME. Supports mobility management, session management, IP address management, etc. between a UE and a network.

RAT: an abbreviation of Radio Access Technology. Means GERAN, UTRAN, E-UTRAN, etc.

Proximity service (Proximity Service, ProSe Service or Proximity based Service): means discovery and mutually direct communication between physically adjacent UEs. However, the proximity service is a concept including communication between UEs through a base station and, furthermore, a concept including communication between UEs through a third UE. Here, data on a user plane is exchanged through a direct data path without passing through a 3GPP core network (e.g. EPC).

Proximity: That a UE is located in close proximity to another UE means when a predetermined proximity condition is met. A proximity condition for discovery may be different from a proximity condition for communication.

Range Class: means a rough distance range as a use for ProSe discovery, for example, a geographical distance range, and a distance range as a communication condition.

ProSe-enabled UE: means a UE supporting ProSe discovery, ProSe communication and/or ProSe-supported WLAN direct communication. In the present specification, the ProSe-enabled UE is also referred to as UE simply.

Announcing UE: a UE that notifies of information that can be used by adjacent UEs having discovery rights.

Monitoring UE: a UE that receives interested information from other adjacent UEs.

ProSe-enabled Network: means a network supporting ProSe discovery, ProSe communication and/or ProSe-supported WLAN direct communication. In the present specification, the ProSe-enabled Network is also referred to as network simply.

ProSe discovery: refers to a process of discovering a ProSe-enabled UE when it is closely located.

Open ProSe Discovery: means that it is possible to discover a ProSe-enabled UE without a direct permission when detecting it.

Restricted ProSe Discovery: means that it is possible to discover a ProSe-enabled UE only with a direct permission when detecting it.

ProSe Communication: means performing communication between UEs using an E-UTRAN communication path when a ProSe-enabled UE is closely located. A communication path may be established, for example, directly between UEs or via a local (or neighbor) eNodeB.

ProSe Group Communication: means performing one-to-all group communication using a common communication path established between two or more ProSe-enabled UEs when they are located adjacent to each other.

ProSe E-UTRA communication: means ProSe communication using an E-UTRA communication path.

ProSe-assisted WLAN direct communication: means ProSe communication using a WLAN direct communication path.

ProSe communication path: means a communication path supporting ProSe communication. A path of the ProSe E-UTRA communication can be established directly between ProSe-enabled UEs by using an E-UTRA or an eNodeB. A path of the ProSe-assisted WLAN direct communication can be established directly between the ProSe-enabled UEs via a WLAN.

EPC path (or infrastructure data path): mans a communication path of a user plane via EPC.

ProSe relay: may have two types as a UE capable of operating as a relay for ProSe.

ProSe UE-to-Network Relay: means playing a role of a communication repeater between a ProSe-enabled Network and a ProSe-enabled UE.

ProSe UE-to-UE Relay: means playing a role of a communication repeater between ProSe-enabled UEs.

Meanwhile, the embodiments of the present invention are described with reference to the drawings below.

Figure 7A:
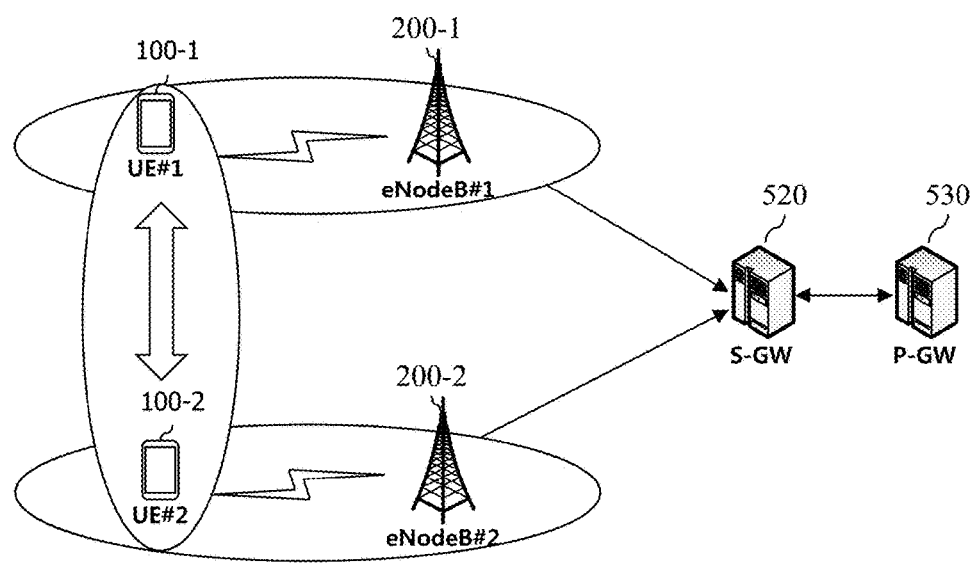
FIG. 7a is an exemplary diagram showing an example of proximity communication.
Figure 7B:
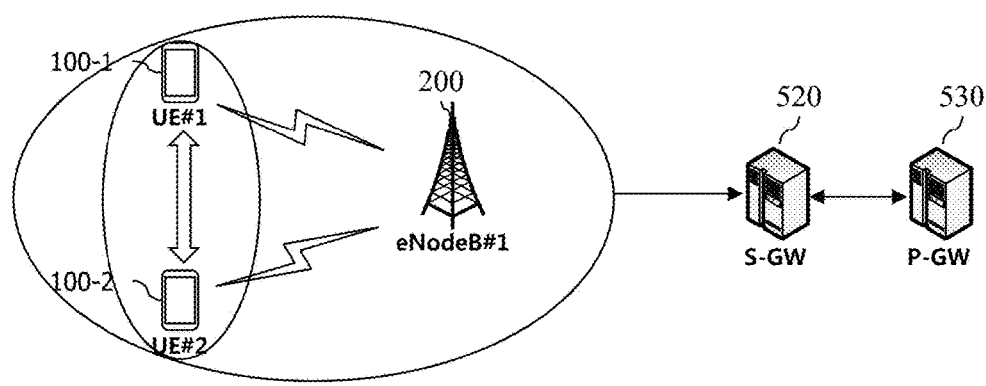
FIG. 7b is an exemplary diagram showing another example of proximity communication.

FIG. 7a is an exemplary diagram showing an example of proximity communication, and FIG. 7b is an exemplary diagram showing another example of proximity communication.

Referring to FIG. 7a, there is illustrated a situation that a UE#1 100-1 and a UE#2 100-2 perform proximity communication through a direct communication path while camping on different eNodeBs, respectively. Referring to FIG. 7b, there is shown a situation that a UE#1 100-1 and a UE#2 100-2 perform proximity communication through a direct communication path while camping on an eNodeB 200, respectively.

As such, the UE#1 100-1 and the UE#2 100-2 may perform proximity communication through a direct communication path bypassing a path through an eNodeB and a core network that a service provider operates.

The term, direct communication path, may be variously referred to as data path for proximity service, data path based on proximity service or proximity service communication path. Furthermore, communication through the direct communication path may be variously called direct communication, proximity service communication or proximity service-based communication.

Figure 8:
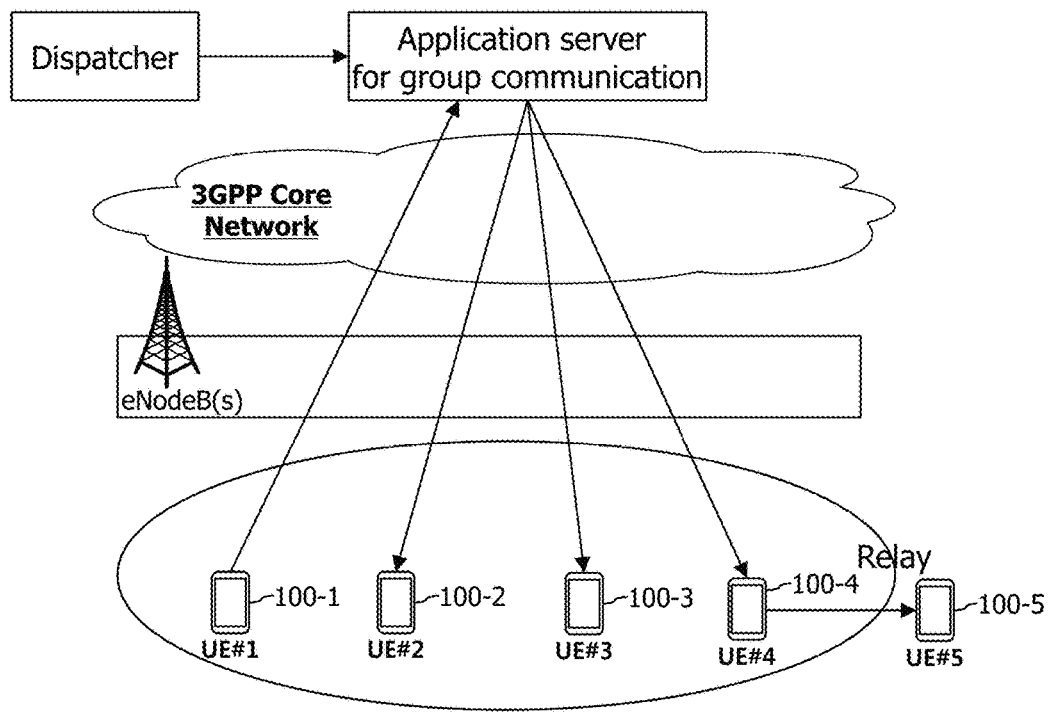
FIG. 8 shows architecture for group communication service as an example of proximity service.

FIG. 8 shows architecture for group communication service as an example of proximity service.

As shown in FIG. 8, a UE#1 100-1, a UE#2 100-2, a UE#3 100-3, a UE#4 100-4 and a UE#5 100-5 have joined a group communication service provided by an application server and all have belonged to a same group. The group may be managed by a dispatcher illustrated in FIG. 8.

A service such as Push-To-Talk (PTT) can serve as an example of the group communication service. When the group communication service is described with an example of the PTT service, a UE may become a talking party in group communication and transmit media (e.g. voice), and a plurality of other UEs may receive the media from the UE of the talking party. Here, several UEs cannot simultaneously become talking parties and transmit media.

Assuming that the UE#1 100-1 performs discovery in the group, the UE#2 100-2, the UE#3 100-3 and the UE#4 100-4 are within a discovery range of the UE#1 100-1, but the UE#5 100-5 is out of the discovery range. For the UE#5 100-5, the UE#4 100-4 may operate as a repeater.

That is, it is shown in FIG. 8 that the UE#5 100-5 receives a group communication service through the UE#4 100-4. This is a case where the UE#5 100-5 is located outside an E-UTRAN coverage or is located inside an E-UTRAN coverage not supporting group communication, and in this case, the UE#5 100-5 may receive the group communication service through a relay of the UE#4 100-4. In the present specification, the E-UTRAN coverage supporting the group communication is referred to as a group communication service range.

However, if the UE#4 100-4 or the UE#5 100-5 moves or if a channel situation changes and thus a connection between the UE#5 100-5 and the UE#4 100-3 is cut off, the UE#5 100-5 must select another UE capable of operating as a relay (specifically, a relay between a ProSe UE and a network).

However, if the connection with the UE#4 100-4 operating as the relay is cut Off, a procedure of reselecting another UE to recover the cut-off connection is not provided in the conventional technique, thereby causing a problem in that group communication is suspended. Further, an aspect regarding a reselection time and a reselection condition is not provided either in the conventional technique.

Accordingly, disclosures of the present specification propose methods for solving the aforementioned problems.

BRIEF DESCRIPTION ON DISCLOSURES OF THE PRESENT SPECIFICATION

The disclosures of the present specification proposes mechanisms regarding a ProSe relay for effectively performing a discovery for a proximity service in a mobile communication system such as a 3GPP evolved packet system (EPS).

Hereinafter, the content regarding a UE which receives a service related to a ProSe public safety mentioned in some embodiments of the present specification is for exemplary purposes only, and is also applicable to a UE not receiving the service related to the public safety.

In the following descriptions, the content related to an operation in which a UE capable of operating as a ProSe relay performs an announce procedure is supported by U.S. Provisional Application No. 61/843,059, and the content related to an operation in which a UE desiring to receive a relay service requests for joining and reselects the relay is supported by the U.S. Provisional Application No. 61/843,857.

First, according to a first disclosure of the present specification, the following options i to iii are described.

i) A ProSe-enabled UE can receive configuration information regarding a preferred relay type for each application/group and a relay reselection period from a ProSe server.

ii) The ProSe-enabled UE selects a UE capable of operating as a ProSe relay on the basis of several pieces of information such as configuration information regarding a relay type, a relay type included in an announce, specific service/group information, specific PDN connectivity information (APN information), or the like.

iii) The ProSe-enabled UE persistently/periodically evaluates candidates to be used as a relay at a later time on the basis of the relay reselection period, and stores the candidates in advance in the candidate relay list.

Further, according to a second disclosure of the present specification, the following option iv is additionally described.

iv) When a connection with the relay is cut off or a channel situation becomes worse, one relay is reselected directly from the candidate relay list. Alternatively, when the UE moves geographically, a relay is reselected from the candidate relay list in order to connect to another relay having a better channel.

Meanwhile, according to the first and second disclosures of the present specification, the UE capable of operating as the relay may operate as the relay according to a network grant without having to distinguish a UE which requests a service related to a public safety and a UE which requests a service irrelevant to the public safety. For this, the UE capable of operating as the relay may receive a configuration for a relay type from a network node, e.g., a ProSe server.

On the other hand, according to the first and second disclosures of the present specification, the ProSe-enabled UE may provide information for allowing the ProSe relay to make a necessary decision. The information may be delivered when the ProSe-enabled UE attempts an access to the ProSe relay. An example of the information is as follows.

Establishment cause: Information indicating whether, when the ProSe-enabled UE attempts the access to the ProSe relay, a cause thereof is for a service related to a public safety or for a service irrelevant to the public safety.

Priority level: Information indicating a priority with which processing is achieved.

Information regarding urgency of connection: This may be expressed in unit of seconds or milliseconds.

Meanwhile, according to the first and second disclosures of the present specification, information to be announced by a UE capable of playing a role of a ProSe relay may be as follows. Examples thereof may include a supported maximum data transfer rate, location information, information regarding the number of current relayed UEs, load information, or the like. Meanwhile, the ProSe relay may reject the connection attempt, and for this, may transmit, for example, an RRC_ProSe_Relay_Connection_Reject message. Alternatively, the ProSe relay may release the connection, and for this, may transmit, for example, an RRC_ProSe_Relay_Connection_Release message. In this case, the ProSe relay may transmit information for reporting the message to the ProSe-enabled UE by inserting a wait time, for example, rWaitTime.

Hereinafter, a control mechanism proposed in the first and second disclosures of the present specification is simply summarized by combining the following operations.

i) A procedure in which a UE capable of operating as a ProSe relay is registered: The UE capable of operating as the ProSe relay performs a registration request to a network to operate as the ProSe relay. In this case, the UE may announce information regarding a supported relay type, for example, a UE-to-network relay type or a UE-to-UE relay type, to the network. In this case, if the UE desires a specific relay type, a request of the specific relay type may be announced to the network. The network may grant the registration request by considering subscriber information and a UE/network environment. In this case, the network may designate a relay type. Alternatively, even if the UE does not request the specific relay type, the network may designate the relay type, and irrespective of whether there is a request or not, the network may designate a grantable relay type. When the UE does not request the specific relay type but only announces to the network that the specific relay type is preferred, the network may also announce to the UE the specific relay type in an advice manner rather than designing it. Meanwhile, the network may also designate information on a hop that can be assisted by relaying of the UE and may deliver it to the UE. During the registration process, the UE may receive configuration information related to the relay from the network. Alternatively, the configuration information related to the relay may be received through an additional procedure or may be received in advance. The configuration information may include information such as a relay type and a reselection period.

ii) A procedure in which a relayed UE selects a UE capable of operating as a ProSe relay: The relayed UE may select the UE capable of operating as the relay on the basis of a required relay type and announce information. The UE selects the UE for operating as the ProSe relay according to a current environment of the UE. For the selection, the configuration information received from the network and information included in the announce message received from the UE capable of operating as the ProSe relay may be utilized. After selecting the UE for operating as the relay, the relayed UE may request to join a specific group for group communication in a process of receiving a service request and grant, and it may be granted from the network.

iii) A ProSe relay bearer setup procedure: The relayed UE performs a procedure for establishing a connection with the selected relay UE. In this process, several methods of ProSe discovery and communication may be used. After a relay bearer is setup, the UE may perform a registration process to the network (e.g., the ProSe server) via the relay UE. Through the registration process, information indicating a desire for joining to a specific group and receiving a service via a current relay to the network.

iv) A procedure of reselecting the UE for operating as the relay: The relayed UE always monitors and checks a connection state with respect to the relay. If the connection is cut off or a channel state becomes worse, the relay UE must reselect the UE for operating as the relay. When a synchronization procedure and a discovery procedure are performed for reselection after the connection is cut off, since a significantly long time is consumed, the relayed UE may periodically manage a candidate relay list for reselection.

Hereinafter, a mechanism according to the first disclosure of the present specification will be first described with reference to the accompanying drawings.

Figure 9:
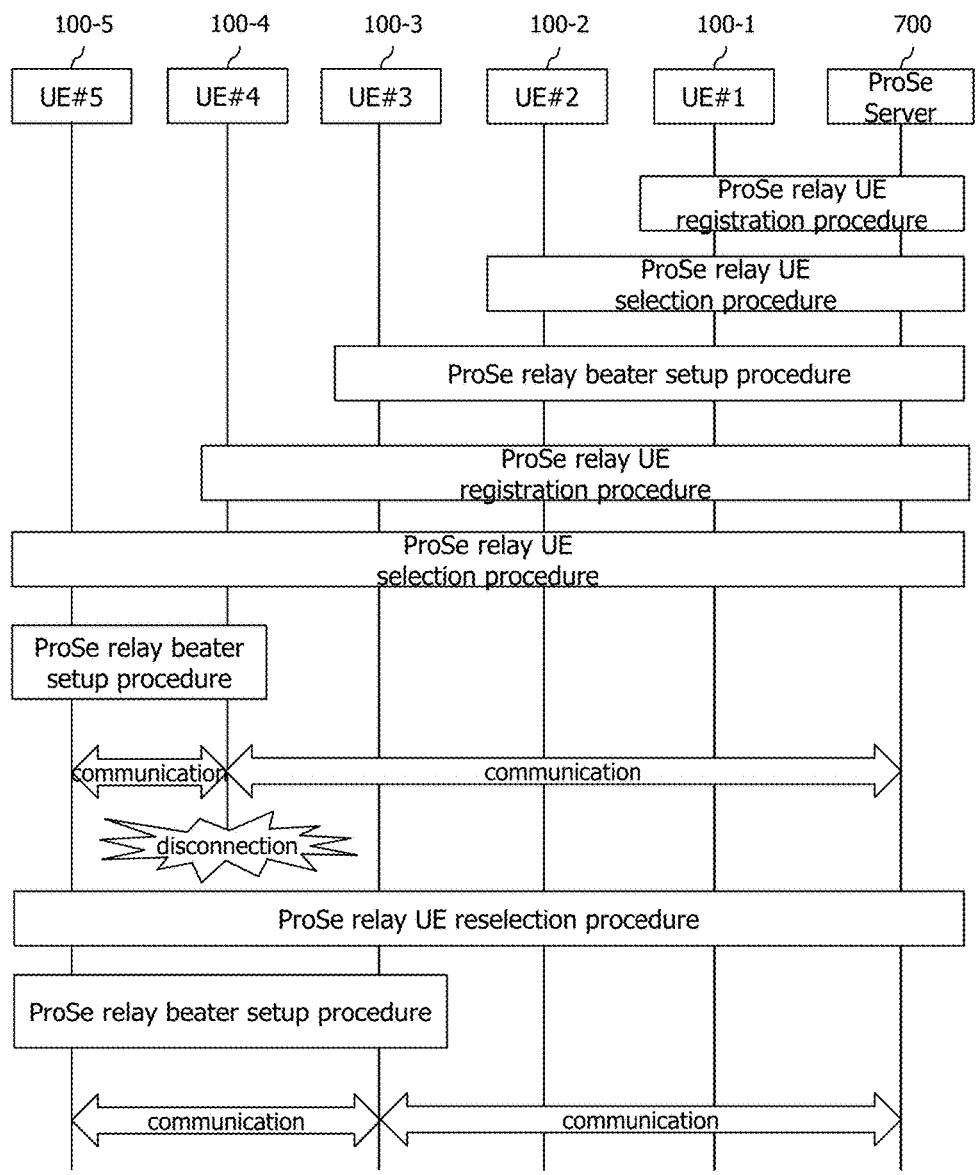
FIG. 9 is an exemplary flowchart showing a procedure of a proposed mechanism in brief according to a first disclosure of the present specification.

FIG. 9 is an exemplary flowchart showing a procedure of a proposed mechanism in brief according to the first disclosure of the present specification.

As can be seen from FIG. 9, each of UEs, i.e., a UE#1 100-1, a UE#2 100-2, a UE#3 100-3, and a UE#4 100-4, capable of operating as a relay for a UE#5 100-5 performs a registration procedure on a ProSe server 700. In this case, each UE may deliver information regarding a relay type supported by the UE.

The relayed UE#5 100-5 selects the UE#4 100-4 as the relay on the basis of information on a necessary relay type, information included in an announce message received from each UE capable of operating as the relay, or the like.

Subsequently, the UE#5 100-5 performs a relay bearer setup procedure with respect to the selected UE#4 100-4.

Thereafter, if a connection with the UE#4 100-4 is cut off or if a channel situation becomes worse, the UE#5 100-5 performs a relay reselection procedure.

If the UE#3 100-3 is reselected in the reselection procedure, the UE#5 100-5 performs the relay bearer setup procedure.

Figure 10:
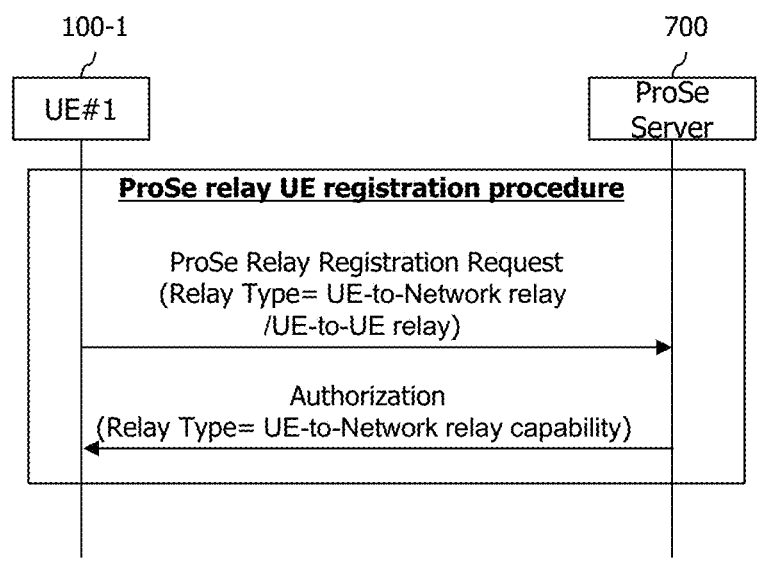
FIG. 10 shows an example of a ProSe relay UE registration procedure in detail according to the first disclosure of FIG. 9.

FIG. 10 shows an example of a ProSe relay UE registration procedure in detail according to the first disclosure of FIG. 9.

As can be seen from FIG. 10, the ProSe relay UE registration procedure may include a process in which a UE#1 100-1 transmits a relay registration request message, e.g., a ProSe relay registration request message, to a ProSe server and a process in which a grant message, e.g., an authorization message, is transmitted when the ProSe server grants the relay registration request.

The relay registration request message may include information on a relay type supported by the UE#1, e.g., a UE-to-network relay type or a UE-to-UE relay type.

The grant message may include information on a relay type granted to the UE#1 by the ProSe server.

Figure 11:
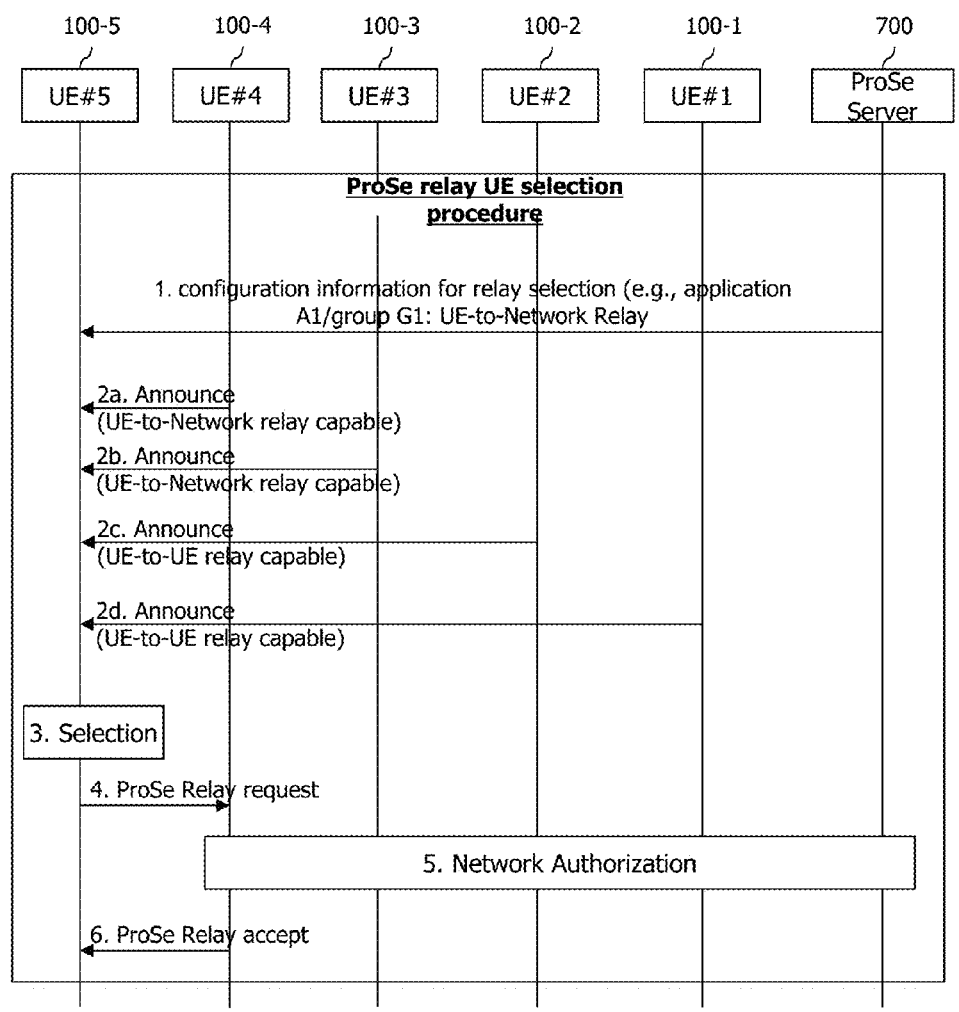
FIG. 11 shows an example of a ProSe relay UE selection procedure in detail according to the first disclosure of FIG. 9.

FIG. 11 shows an example of a ProSe relay UE selection procedure in detail according to the first disclosure of FIG. 9.

Figure 12:
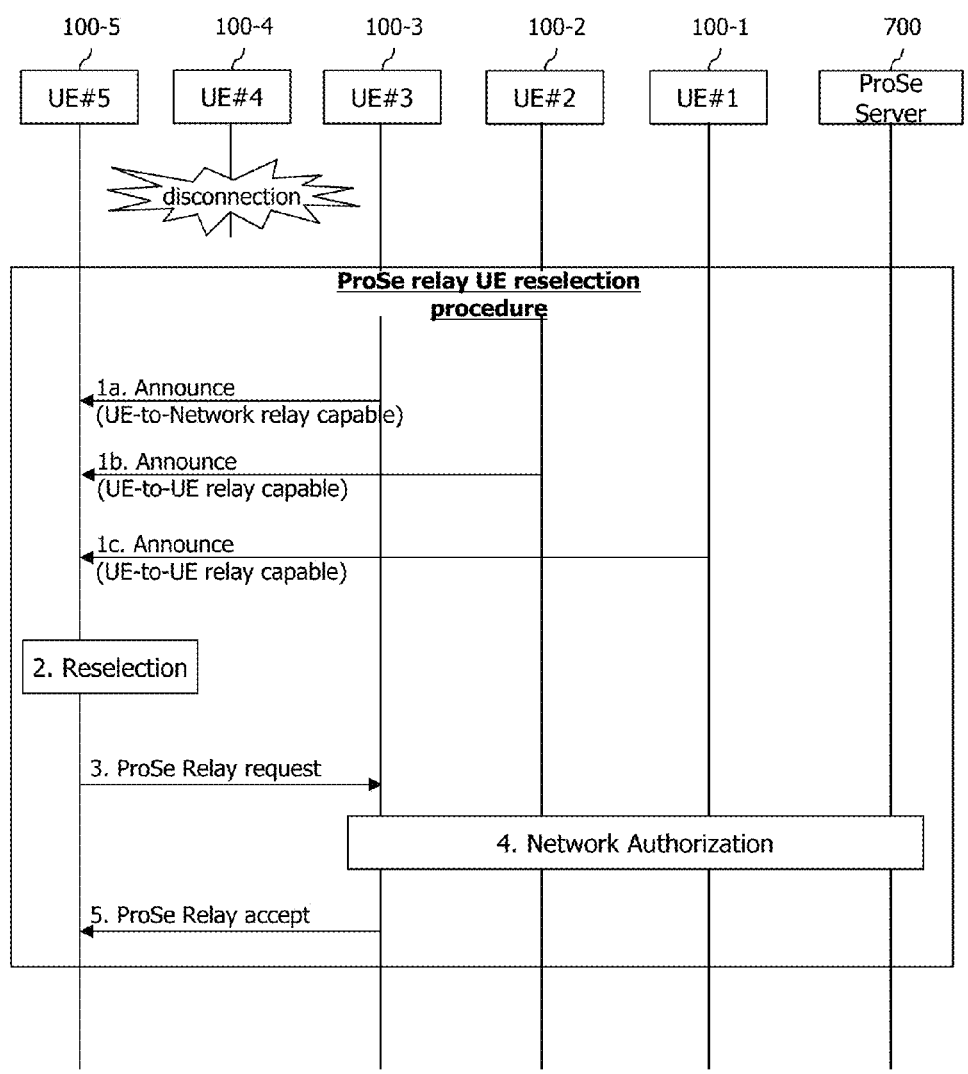
FIG. 12 shows an example of a ProSe relay UE reselection procedure in detail according to the first disclosure of FIG. 9.

As can be seen from FIG. 11, a relayed UE#5 100-5 receives configuration information for relay selection from a network, e.g., a ProSe server 700. The configuration information may include necessary relay type information for each application/group. In FIG. 12, a UE-to-network relay is shown as exemplary necessary relay type information.

A relayed UE#5 100-5 receives an announce message from each of the UE#100-1, UE#2 100-3, UE#3 100-3, and UE#4 100-4 capable of operating as a relay. The announce message includes supported relay type information.

The relayed UE#5 100-5 selects the UE#4 100-4 having the best channel among UEs matched to a necessary relay type required in an application/group to be performed by the UE#5 100-5 among relay types in the received announce message.

Then, the relayed UE#5 100-5 transmits a relay request message, e.g., a ProSe relay request message, to the UE#4 100-4.

The UE#4 100-4 performs a procedure for requesting a grant to the network, e.g., the ProSe server 700. When granted, the UE#4 100-4 transmits a relay grant accept message, e.g., a ProSe relay accept message, to the UE#5 100-5.

FIG. 12 shows an example of a ProSe relay UE reselection procedure in detail according to the first disclosure of FIG. 9.

The ProSe relay UE reselection procedure of FIG. 12 may be performed periodically or at the occurrence of a specific event (when the existing connection is cut off due to a geographical movement or when a channel state becomes worse).

First, when a connection with a UE#4 100-4 operating as a relay is cut off, a UE#5 100-5 receives an announce message from each of other UEs, i.e., a UE#1 100-1, a UE#2 100-3, and a UE#3 100-3, capable of operating as the relay. The announce message includes supported relay type information.

The relayed UE#5 100-5 selects the UE#3 100-3 having the best channel among UEs matched to a necessary relay type required in an application/group to be performed by the UE#5 100-5 among relay types in the received announce message.

Then, the relayed UE#5 100-5 transmits a relay request message, e.g., a ProSe relay request message, to the UE#3 100-3.

The UE#3 100-3 performs a procedure for requesting a grant to the network, e.g., the ProSe server 700. When granted, the UE#3 100-3 transmits a relay grant accept message, e.g., a ProSe relay accept message, to the UE#5 100-5.

The function of the ProSe server described up to now with reference to FIG. 9 to FIG. 12 may be performed by an MME or an HSS as a network node, or may be performed by other network nodes.

Further, the content described up to now with reference to FIG. 9 to FIG. 12 may be applied not only for a group communication service but also for a one-to-one communication service and a broadcast communication service.

According to the first disclosure described up to now with reference to FIG. 9 to FIG. 12, the UE#5 100-5 may reselect another UE capable of operating as a relay. However, to perform the reselection, a synchronization procedure and a discovery procedure must be performed again, which disadvantageously requires a significant time. Details thereof will be described with reference to FIG. 13.

Figure 13:
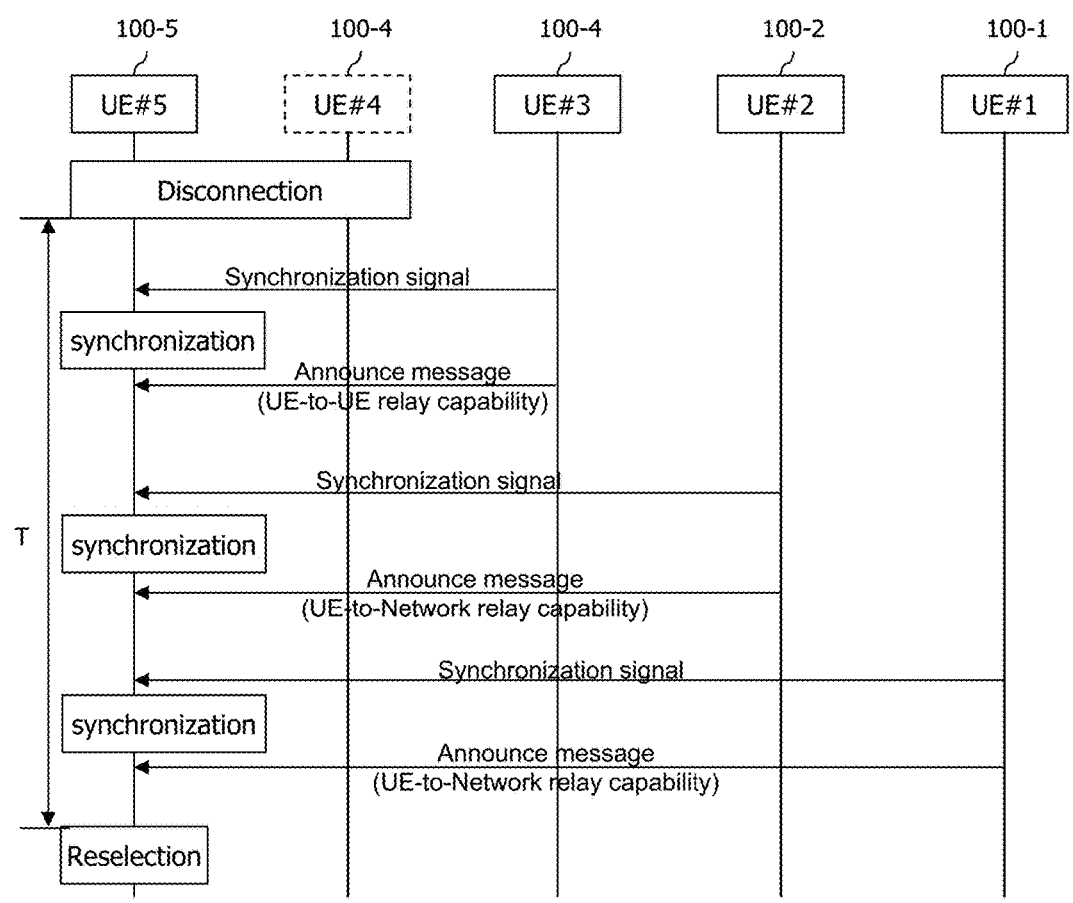
FIG. 13 shows an example of a time required to perform a procedure necessary to reselect a relay according to the first disclosure of the present specification.

FIG. 13 shows an example of a time required to perform a procedure necessary to reselect a relay according to the first disclosure of the present specification.

As can be seen from FIG. 13, if a connection between a UE#5 100-5 and a UE#4 100-4 is cut off, the UE#5 100-5 receives a synchronization signal from each UE, adjusts a time/frequency synchronization, and then receives an announce message. In this case, each announce message may include capability information indicating whether a UE has a capability for a UE-to-UE relay or has a capability for a UE-to-network relay.

Upon receiving the announce message from all UEs, the UE having the capability for the UE-to-network relay may be reselected on the basis of the capability information included in the announce message.

As described up to now, when the connection is cut off, the reselection can be performed only after each announce message is acquired after being synchronized with other UEs, and thus a time T required until the reselection becomes significantly long.

Therefore, the second disclosure of the present specification is proposed to solve such shortcomings. According to the second disclosure, the relayed UE#5 100-5 may periodically confirm whether relay selection is necessary on the basis of a channel situation, signal strength, or the like. The relayed UE performs the reselection in the following cases.

When the relayed UE#5 100-5 moves geographically.
When a connection with the relay is cut off
When a channel with the relay becomes worse.

Since the relayed UE persistently updates and maintains the candidate relay list on the basis of the announce message from other UEs capable of operating as the relay, when the connection with the relay is cut off or when the channel becomes worse, another relay can be rapidly reselected.

Figure 14:
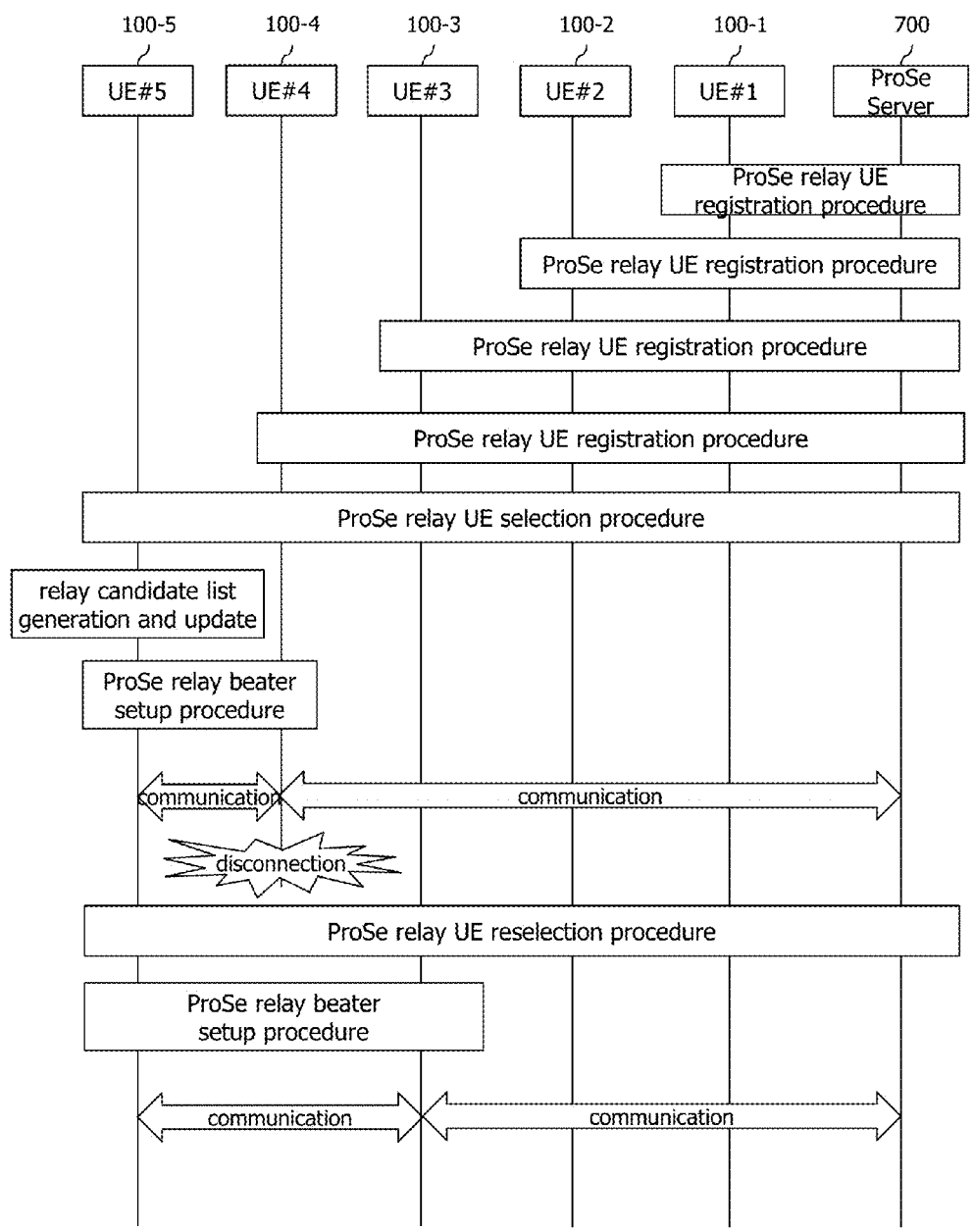
FIG. 14 is an exemplary flowchart showing a procedure of a proposed mechanism in brief according to a second disclosure of the present specification.

FIG. 14 is an exemplary flowchart showing a procedure of a proposed mechanism in brief according to the second disclosure of the present specification.

The brief procedure of the mechanism according to the second disclosure of FIG. 14 is significantly similar to the brief procedure of FIG. 9. A difference lies in that a UE#5 100-5 generates a candidate relay list in a process of selecting a UE#4 100-4 as a relay, and thereafter the UE#5 100-5 periodically manages an update of the candidate relay list, thereby being able to rapidly reselect another relay. Similar descriptions will not be repeated. The content described with reference to FIG. 9 to FIG. 12 is directly applied, and only a ProSe relay UE reselection procedure will be described with reference to FIG. 15.

Figure 15:
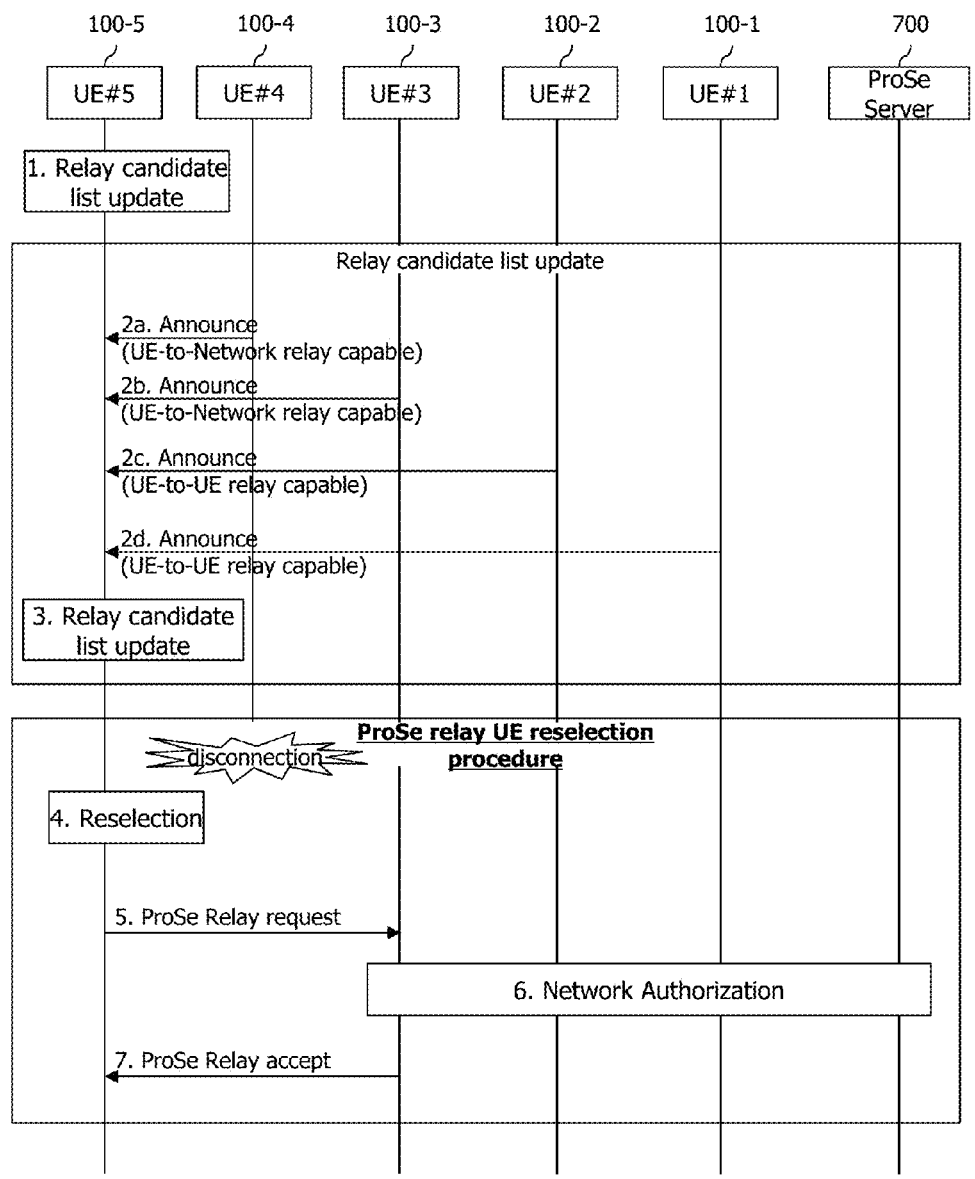
FIG. 15 shows an example of a candidate relay list update procedure and a ProSe relay UE reselection procedure in detail according to the second disclosure of FIG. 14.

FIG. 15 shows an example of a candidate relay list update procedure and a ProSe relay UE reselection procedure in detail according to the second disclosure of FIG. 14.

Referring to FIG. 15, a UE#5 100-5 periodically updates a candidate relay list generated in a process of selecting a UE#4 100-4 as a relay. Specifically, the UE#5 100-5 receives an announce message from each of a UE#1 100-1, a UE#2 100-2, a UE#3 100-3, and the UE#4 100-4, each capable of operating as the relay, and updates UEs supporting a relay type identical to a relay type required in an application/group to be performed by the UE#5 100-5 among relay types included in the announce message. The UEs included in the candidate relay list may be prioritized according to a channel situation/signal strength.

Thereafter, the UE#5 100-1 periodically confirms whether to perform a ProSe relay UE reselection procedure according to the channel situation or the signal strength.

If a specific event occurs, for example, if the existing connection is cut off due to a geographical movement or if the existing connection is cut off when a channel state becomes worse, the UE#5 100-5 may perform the ProSe relay UE reselection procedure.

That is, the UE#5 100-5 properly reselects a UE capable of operating as the relay in the candidate relay list.

It is illustrated in FIG. 15 for example that the UE#3 100-3 is reselected. Then, the UE#5 100-5 transmits a relay request message, e.g., a ProSe relay request message, to the UE#3 100-3.

The UE#3 100-3 performs a procedure for requesting a grant to the network, e.g., the ProSe server 700. When granted, the UE#3 100-3 transmits a relay grant accept message, e.g., a ProSe relay accept message, to the UE#5 100-5.

Meanwhile, hereinafter, a method of generating/managing/maintaining the candidate relay list will be described in greater detail.

The candidate relay list may be generated/managed/maintained in unit of a user/UE/group/application, etc.

Further, UEs included in the candidate relay list may be prioritized according to signal strength or a proximity level. Alternatively, the UEs included in the candidate relay list may be managed in unit of a group (a selection preference high/middle/low or signal strength level 1/2/3, etc.) which may be a criterion of selection. A factor for determining the priority may use several pieces of information on the basis of not only a channel state but also several physical factors and logical information. Further, it may be determined on the basis of not only one criterion but also a combination of several factors.

Figure 16:
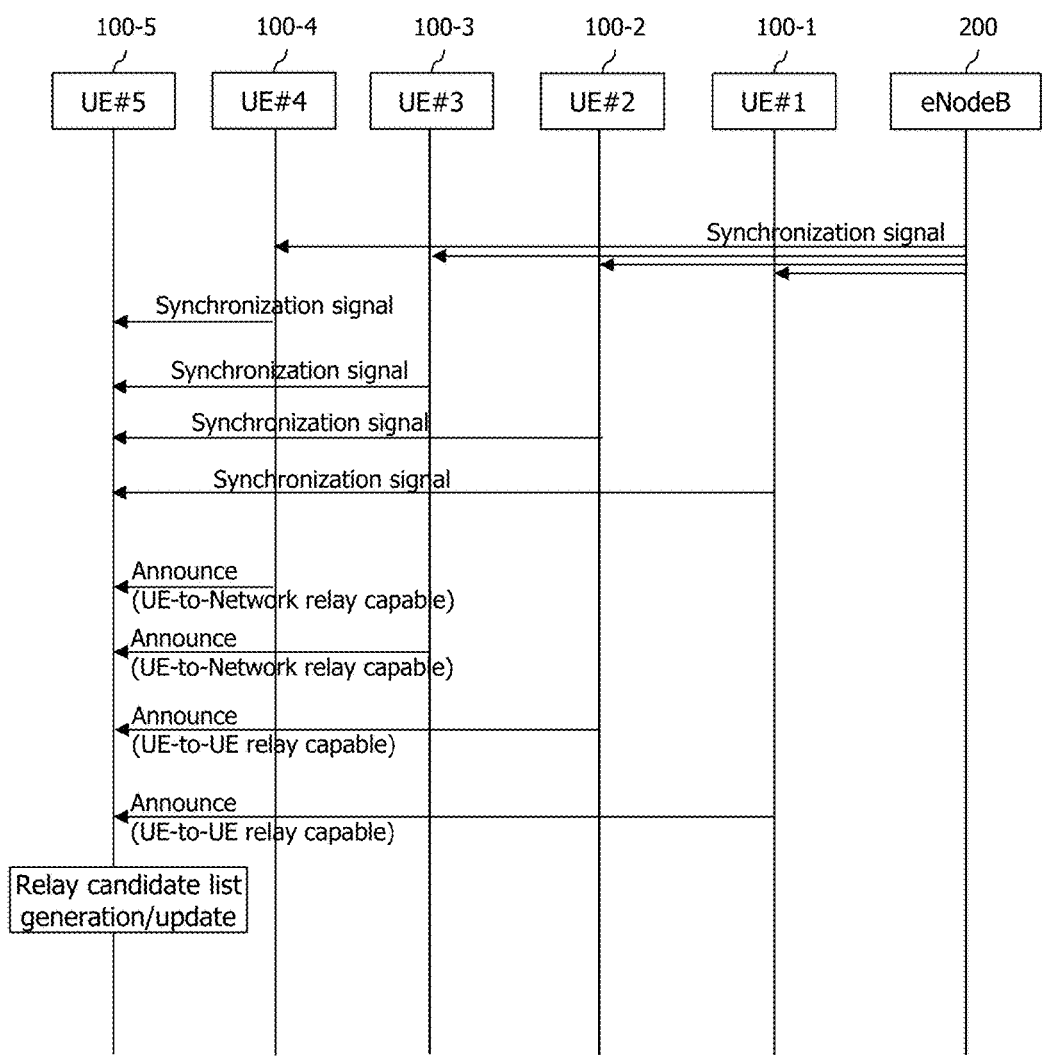
FIG. 16 is a flowchart showing a candidate relay list update procedure in detail according to the second disclosure.

FIG. 16 is a flowchart showing a candidate relay list update procedure in detail according to the second disclosure.

First, a UE#1 100-1, a UE#2 100-2, a UE#3 100-3, and a UE#4 100-4, each capable of operating as a relay, generate a synchronization signal (or a discovery signal) for ProSe according to the synchronization signal from an eNodeB 200 and broadcasts the synchronization signal. The synchronization signal transmitted by the UE#1 100-1, the UE#2 100-2, the UE#3 100-3, and the UE#4 100-4, each capable of operating as the relay, may include a cell ID of the eNodeB 200 and an ID of each UE.

Then, a UE#5 100-5 receives each synchronization signal (or the discovery signal), adjusts a frequency/time synchronization with each UE, and thereafter receives an announce message from each UE.

Then, the UE#5 100-5 generates/updates a candidate relay list. The candidate relay list may include time/frequency synchronization information acquired by the synchronization signal (or the discovery signal) in addition to relay type information, candidate relay identifier, IP address, specific PDN connectivity information (APN information), and specific service/group information included in the announce message. Further, the candidate relay list may also include information regarding signal strength, reference signal received power (RSRP), reference signal received quality (RSRQ), or the like calculated on the basis of the synchronization signal received from each UE and the announce message.

Meanwhile, since the synchronization signals of the UEs is generated according to the synchronization signal from the eNodeB 200 as described above, the synchronization signals of the UEs may be expressed as a time/frequency offset against the synchronization signal from the eNodeB 200. Therefore, synchronization information with respect to the UEs included in the candidate relay list may be expressed as an offset with respect to the synchronization signal of the eNodeB. Therefore, if it is intended to select or reselect one relay included in the candidate relay list, a cell ID and offset of the eNodeB may be considered.

Therefore, if the reselection is necessary, the UE#5 100-5 may provide a service to be performed, and may select from the candidate relay list a UE which uses an APN identical to an APN for its service, has excellent signal strength/RSRP/RSRQ, and is capable of operating as a relay type required for its service. The APN is considered herein because a service is delayed and complexity is increased, since a new PDN connection procedure must be performed for the APN for its service when the UE#5 100-5 selects and accesses a UE which uses an ANP different from the ANP for its service as a relay. However, when the UE#5 100-5 selects and accesses the UE which uses the same APN as the APN for its service, the service can be used without the new PDN connection process.

Meanwhile, the candidate relay list may be updated on the basis of a period of receiving the synchronization signal or the announce message from each UE. If the period of receiving the announce message is shorter in comparison with the synchronization signal, it may be effective to update the candidate relay list of the relay according to the period of receiving the announce message or to be longer than the period of receiving the announce message. Hereinafter, a period of updating the candidate relay list will be described in greater detail with reference to FIG. 17.

Figure 17:
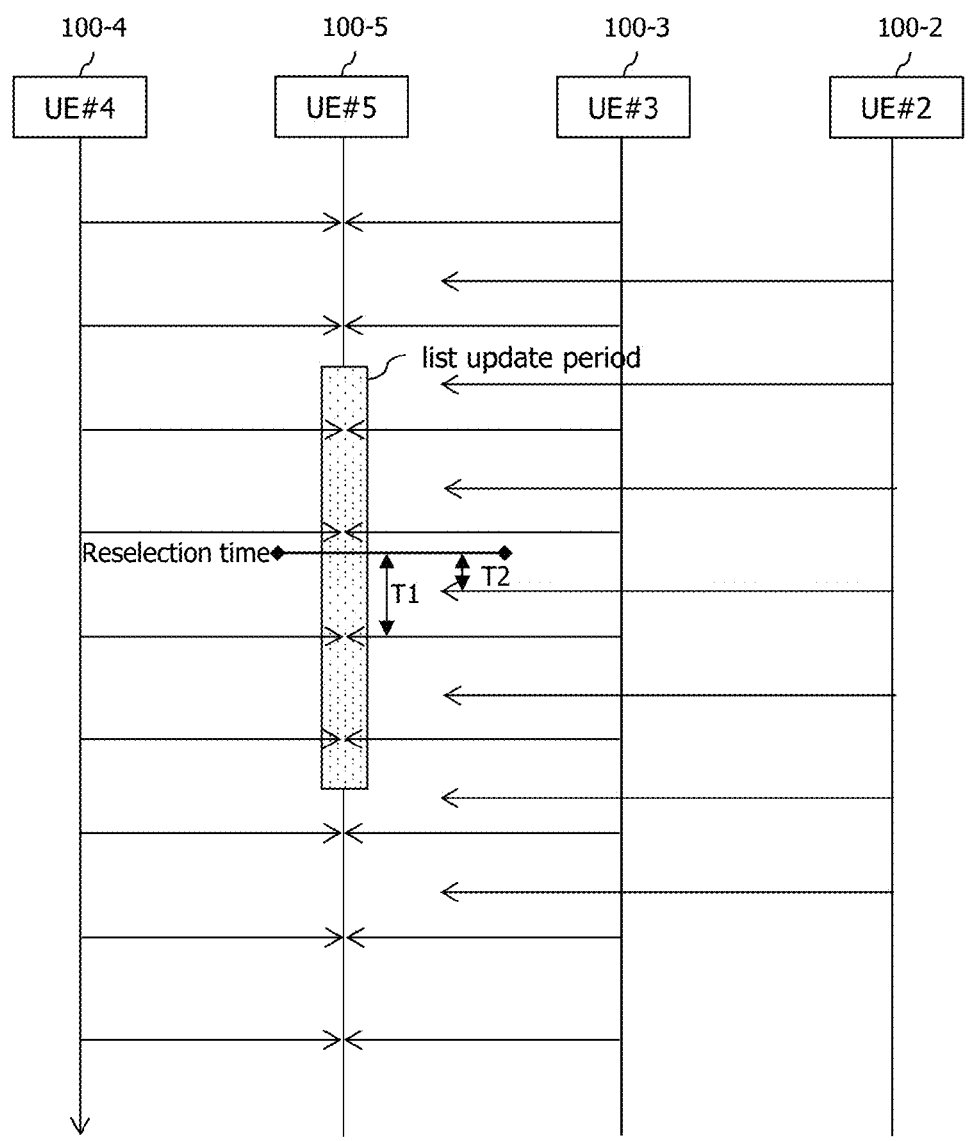
FIG. 17 shows an example of an update period of a candidate relay list.

FIG. 17 shows an example of an update period of a candidate relay list.

It is show in FIG. 17 that each of a UE#2 100-2, a UE#3 100-3, and a UE#4 100-4 transmits a synchronization signal. In addition, a period of updating a candidate relay list by a UE#5 100-5 which is assisted by relaying of the UE#4 100-4 operating as a relay is marked with shadow. As such, the update period of FIG. 17 is longer than a synchronization signal transmission period of the UE#2 100-2, the UE#3 100-3, and the UE#4 100-4.

The UE#5 100-5 is assisted by relaying of the UE#4 100-4, and thus is synchronized according to a synchronization signal from the UE#4 100-4. However, although a synchronization signal period of the UE#4 100-4 and a synchronization signal period of the UE#3 100-3 are equal to each other, a synchronization signal period of the UE#2 100-2 is different. Herein, a candidate relay list of the UE#5 100-5 may include identifiers of the UE#2 100-2, the UE#3 100-3, and the UE#4 100-4 and synchronization information.

When the UE#5 100-5 intends to reselect one of the UE#2 100-2 and UE#3 100-3 included in the candidate relay list as the relay instead of the UE#4 100-4, complexity may be simplified by selecting the UE#3 100-3 having a synchronization signal period identical to a synchronization signal period of the UE#4 100-4.

On the other hand, it is assumed a case where there is data to be transmitted by the UE#5 100-5 at the illustrated reselection time, for example, a case where the UE#5 100-5 is a talker in the group communication and thus there is data to be transmitted. In this sense, a time T1 is left until a synchronization signal is received from the UE#3 100-3, and a time T2 shorter than T1 is left until a synchronization signal is received from the UE#2 100-2. Therefore, if there is a need to reselect a relay in a state where the UE#5 100-5 is the talker in the group communication and thus there is data to be transmitted, it may be more effective to reselect the UE#2 100-2 in comparison with the UE#3 100-3.

Meanwhile, if there is no data to be transmitted by the UE#5 100-5 at the illustrated reselection time, for example, if the UE#5 100-5 is a listener in the group communication and thus there is no data to be transmitted, as described above, the complexity may be simplified by selecting the UE#3 100-3 having a synchronization signal period identical to a synchronization signal period of the UE#4 100-4.

On the other hand, although only a period of receiving a synchronization signal is described with reference to FIG. 17, if the UE#5 100-5 intends to reselect one of the UE#2 100-2 and the UE#3 100-3 as a relay instead of the UE#4 100-4, the reselection may be achieved when the synchronization signal is transmitted at a frequency most similar to a frequency of a synchronization signal of the UE#4 100-4.

On the other hand, the number of candidate relay UEs included in the candidate relay list may be flexibly maintained. For example, if strength of a signal received by the UE#5 100-5 from the UE#4 100-4 is great and a channel state is good, the UE#5 100-5 may decrease the number of candidate relay UEs included in the candidate relay list or may increase a period of updating the candidate relay list.

This is to mitigate a load of maintaining and managing the candidate relay list. Meanwhile, the number of the candidate relay UEs included in the candidate relay list may be flexibly managed according to whether the UE#5 100-5 is a talker or a listener in group communication.

Not all of the procedures described up to now with reference to respective drawings are necessarily performed, and only some steps thereof may be performed optionally The content described up to now can be implemented in hardware. This will be described with reference to FIG. 18.

Figure 18:
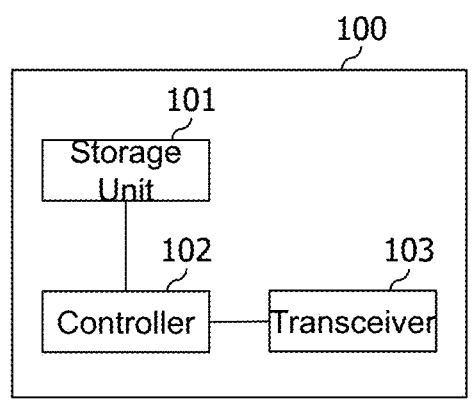
FIG. 18 is a block diagram of a UE 100 according to an embodiment of the present invention.

FIG. 18 is a block diagram of a UE 100 according to an embodiment of the present invention.

As shown in FIG. 18, the UE 100 includes a storage means 101, a controller 102, and a transceiver 103.

The storage means 101 stores the aforementioned methods.

The controller 102 controls the storage means 101 and the transceiver 103. More specifically, the controller 102 executes each of the aforementioned methods stored in the storage means 101. The controller 102 transmits the aforementioned signals via the transceiver 103.

Although exemplary embodiments of the present invention have been described above, the scope of the present invention is not limited to the specific embodiments and the present invention may be modified, changed, or improved in various ways within the scope of the present invention and the category of the claims.

What is claimed is:

1. A method of selecting or reselecting a relay for a proximity service, comprising:
   receiving, by a user equipment (UE) which is to receive a relay service, synchronization signals from a plurality of other UEs capable of operating as a relay;
   receiving, by the UE, announce messages from the plurality of other UEs capable of operating as the relay, wherein the announce messages from the other UEs include relay type information on whether to support a UE-to-network relay service, packet data network (PDN) information, access point name (APN) information, and service/group information;
   generating, by the UE, a candidate relay list on the basis of the relay type information, PDN/APN information, and service/group information contained in the announce messages received from the plurality of other UEs; and
   selecting or reselecting, by the UE, one of the other UEs in the candidate relay list in consideration of relay type, PDN/APN, and service/group information necessary for a service of the UE,
   wherein the APN is considered to allow the UE to select another UE using the same APN as the APN for the service of the UE, thereby preventing a new PDN connection from being established.

2. The method of claim 1, further comprising measuring reference signal received power (RSRP) and reference signal received quality (RSRQ) on the basis of the synchronization signals received from the plurality of other UEs, wherein in the selecting or reselecting one of the other UEs, the RSRP and the RSRQ are additionally considered.

3. The method of claim 1, wherein a period of updating the candidate relay list and a size of the candidate relay list are determined according to whether the UE is a talker or a listener in a group communication service.

4. The method of claim 1, wherein the size of the candidate relay list is expressed by the number of other UEs included in the candidate relay list.

5. The method of claim 1, wherein the synchronization signal comprises a cell identifier (ID) of a base station and ID information of the UE capable of operating as the relay.

6. A user equipment (UE) for selecting or reselecting a relay for a proximity service, comprising:
   a receiver which receives a synchronization signal and an announce message from each of a plurality of other UEs capable of operating as the relay, wherein the announce messages from each of the other UEs contain relay type information on whether to support a UE-to-network relay service, packet data network (PDN)/access point name (APN) information, and service/group information; and
   a processor which generates a candidate relay list on the basis of the relay type information, PDN/APN information, and service/group information contained in the announce messages received from the plurality of other UEs, and selects or reselects one of the other UEs in the candidate relay list in consideration of relay type, PDN/APN, and service/group information necessary for a service of the UE,
   wherein the APN is considered to allow the UE to select another UE using the same APN as the APN for the service of the UE, thereby preventing a new PDN connection from being established.

7. The UE of claim 6, wherein the processor measures reference signal received power (RSRP) and reference signal received quality (RSRQ) on the basis of the synchronization signals received from the plurality of other UEs, and additionally considers the RSRP and the RSRQ when selecting or reselecting one of the other UEs.

8. The UE of claim 6, wherein a period of updating the candidate relay list and a size of the candidate relay list are determined according to whether the UE is a talker or a listener in a group communication service.

9. The UE of claim 6, wherein the size of the candidate relay list is expressed by the number of other UEs included in the candidate relay list.

10. The UE of claim 6, wherein the synchronization signal comprises a cell ID of a base station and ID information of the UE capable of operating as the relay.

* * * * *